(12) United States Patent
Wright et al.

(10) Patent No.: US 6,170,193 B1
(45) Date of Patent: Jan. 9, 2001

(54) SELF-DRAINING IN-GROUND FLOWER HOLDER

(75) Inventors: John J. Wright, Garfield Heights; Frank W. Was, Chesterland, both of OH (US)

(73) Assignee: Catholic Cemeteries Association of The Diocese of Cleveland, Cleveland, OH (US)

( * ) Notice: Under 35 U.S.C. 154(b), the term of this patent shall be extended for 0 days.

(21) Appl. No.: 09/224,333

(22) Filed: Dec. 31, 1998

(51) Int. Cl.[7] ....................................................... A01G 5/00
(52) U.S. Cl. ................................................................. 47/41.1
(58) Field of Search ............................... 47/41, 44.01–14, 47/47, 33, 39, 66

(56) References Cited

U.S. PATENT DOCUMENTS

| | | |
|---|---|---|
| 774,288 | 1/1904 | Temblett et al. . |
| 1,439,143 | 12/1922 | Buss . |
| 1,784,621 | 12/1930 | Boyer . |
| 2,029,314 | 2/1936 | Ellis . |
| 2,062,684 | 12/1936 | Thomas . |
| 2,099,329 | 11/1937 | Comstock . |
| 2,754,625 * | 7/1956 | Rasmussen ............................ 47/41.1 |
| 2,792,960 * | 5/1957 | Walouke ................................ 47/47.1 |
| 3,001,326 * | 9/1961 | OB́rian et al. ........................ 47/41.1 |
| 3,309,814 | 3/1967 | Langley . |
| 3,369,321 | 2/1968 | Blackistone . |
| 4,171,593 | 10/1979 | Bigglestone . |
| 4,306,376 | 12/1981 | Strassacker et al. . |
| 4,631,859 | 12/1986 | Letter et al . |
| 5,199,213 | 4/1993 | Krebs et al. . |
| 5,491,929 | 2/1996 | Peacock et al. . |
| 5,519,966 | 5/1996 | Cassette . |

* cited by examiner

Primary Examiner—Michael J. Carone
Assistant Examiner—Francis T. Palo
(74) Attorney, Agent, or Firm—Fay, Sharpe, Fagan, Minnich & McKee, LLP

(57) ABSTRACT

An in-ground flower holder is provided with a body having a top opening defined by a planar or flanged area and a lower opening passage through which water may flow. An insert is located within the interior of the body, the insert having a gripping area which allows access to the insert by a user when the flower holder is embedded within the ground. A base of the insert is used to carry flowers placed within the body. A bottom surface of a base of the insert carries a plug member which is adapted to substantially a similar size as an opening formed as a funnel in the bottom of the body. When in one holding position, the plug and funnel form a water-tight seal thereby holding any water within the interior. When the insert is moved to another position, the watertight seal is broken and a passage for water out of the interior is provided. A lock maintains the insert within the interior of the body. Additionally, the upper surface of the body or of the lock is configured such that indicia may be placed thereon.

20 Claims, 18 Drawing Sheets

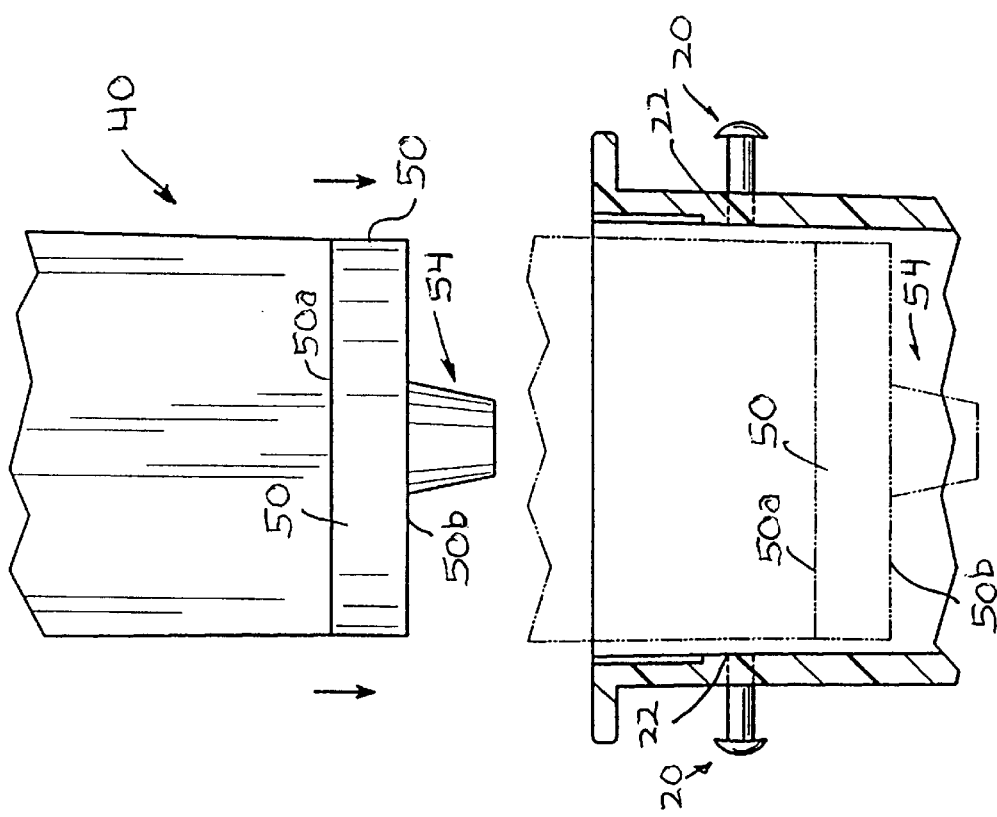
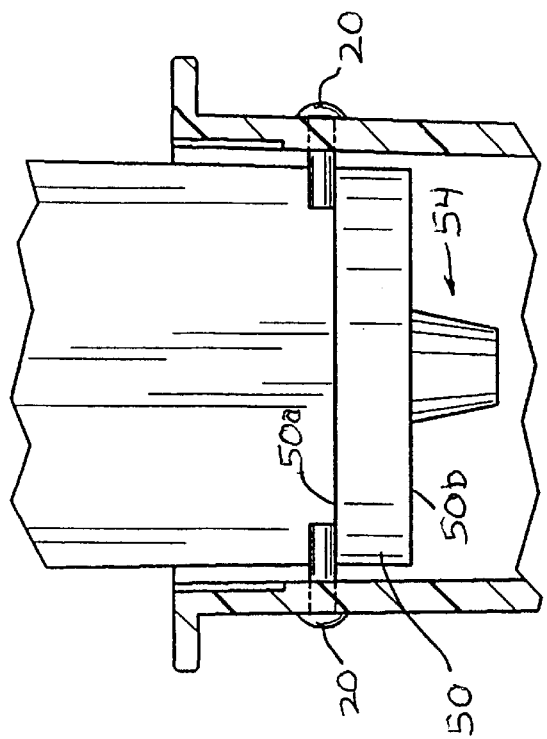
Fig. 10
Fig. 11

SELF-DRAINING IN-GROUND FLOWER HOLDER

BACKGROUND OF THE INVENTION

The present invention is related to flower holders and more particularly to cemetery flower holders installed in-ground such that its opening is substantially flush with the surface of the ground.

Cemeteries often require that a flower holder be substantially even with the ground surface when not in use. This requirement exists in order to facilitate maintenance of the cemetery grounds. In particular, when the grass is being cut it has been found desirable to have flower holders be of a type which allows the cutter to pass over the flower holder without damaging the cutter or the flower holder.

Many types of flower holders which are installed substantially even with the ground have been proposed and manufactured. Such flower holders commonly include an outer sleeve portion within which is carried a vase. When not in use, the vase is arranged with its open end facing into the sleeve whereby the solid bottom end of the vase is substantially level with the ground surface. When in use, the vase is removed from the sleeve, and flowers and water are located within the interior of the vase. The filled vase is then inserted within the outer sleeve with the open end facing out of the sleeve.

While useful, existing flower holders have drawbacks. First, the vase is normally a separate element from the sleeve. Due to this arrangement it is common that the vase becomes lost, damaged or stolen. Particularly, in order to remove water from the vase it is necessary to remove the vase from its location inserted within the sleeve increasing the chance the vase will be lost or damaged. A further drawback occurs when a user is emptying the vase. In this situation water can easily spill onto a user's clothing. Additionally, when the flowers which are in the vase are being removed, the flowers themselves may cause water to drip onto a user's clothing since the water has not previously been drained.

Thus, the present invention is concerned with making a flower holder theftproof and, at the same time, providing a flower holder which increases the efficiency of inserting and removing flowers, all at a reasonable manufacturing cost.

These objects are achieved in accordance with preferred embodiments of the invention which teach a flower holder that includes a body configured so as to be embedded in the ground, with an upper end portion substantially level or flush with the ground surface, and which has an opening for insertion of flowers. A body base portion located at a lower end of the body includes an upper surface and a lower surface within which is designed a funnel section, forming a passage through the base of the body. An insert is fitted within the body such that the insert is capable of vertical movement in relationship to the body. A gripping area is located at an upper end of the insert and is connected to an insert base through divider walls which divide the interior of the body into sections. A plug is located on a lower surface of the insert base and is configured to substantially match the configuration of the funnel. When the gripping area of the insert is held in a first position the plug fits within the funnel thereby providing a watertight seal at the lower end of the body. A lock is further provided to hold the insert within the body.

By the foregoing construction, flowers and water may be inserted into the flower holder, and the water will be maintained within the interior of the body while the gripping area of the insert is held at the first position. When water is to be drained from the interior of the body, the gripping area is moved to a second position. This movement breaks the watertight seal existing between the funnel and the plug, whereby water passes from the interior of the body through the funnel.

In a more limited aspect of the present invention, the lock is a lid which is snapped into engagement with an upper surface of the body acting to stop removal of the insert.

With attention to another embodiment, the lock is a plurality of pins inserted through the sidewall of the body, above a location of the insert.

With attention to still another aspect of the present invention, included in the sidewall of the body are first and second recessed ledges for holding the gripping area in one of the first and second positions.

In accordance with another feature of the present invention, divider walls divide the interior of the body into sections for holding the flowers in a separated arrangement.

With attention to yet another aspect of the present invention, at least one of the lid or a flange of the body have sufficiently planar faces so as to allow inscribing indicia onto the flower holder.

With attention to yet another aspect of the present invention, at least one of the funnel or the plug include a recessed area into which a sealing ring is placed thereby improving the sealing between the plug and funnel.

In consideration of the foregoing, it is therefore a first object of the present invention to provide a new and improved cemetery flower holder which overcomes the deficiencies and disadvantages of existing flower holders.

It is another object of the present invention to provide a new cemetery flower holder which may be easily and efficiently manufactured and marketed.

It is a further object of the present invention to provide a flower holder which is of a durable and reliable construction such that it may be kept in the ground year round.

Still yet another object of the present invention is to a flower holder which supports flowers in a desirable fashion proximal to a gravestone, and insures the insert of the flower holder is kept in a usable condition, wherein water may be drained from the flower holder without removing the insert thereby eliminating the likelihood of theft or damage to the flower holder, as well as decreasing the possibility of having water undesirably splash onto the clothing of a user.

These together with other objects of the invention, along with the various features of novelty which characterize the invention, are pointed out with particularity in the claims annexed to and forming a part of this disclosure. For a better understanding of the invention, its operating advantages and the specific objects obtained by its uses, reference should be made to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annex drawings wherein:

FIGS. 10 and 11 illustrate a manner of locking the insert in the body;

FIG. 16b is a side view of the lid of FIG. 16a;

FIG. 17b is a cross-sectional view along 17b—17b of FIG. 17a;

FIG. 18 is a cross-sectional view taken along line 18—18 of FIG. 17a;

FIG. 19 is a cross-sectional view taken along line 19—19 of FIG. 17a;

DESCRIPTION OF THE PREFERRED EMBODIMENT

With reference now to the drawings, and in particular to FIGS. 1–11, a new flower holder embodying the principles and concepts of the present invention and generally designated by A will be described.

Figure 1:
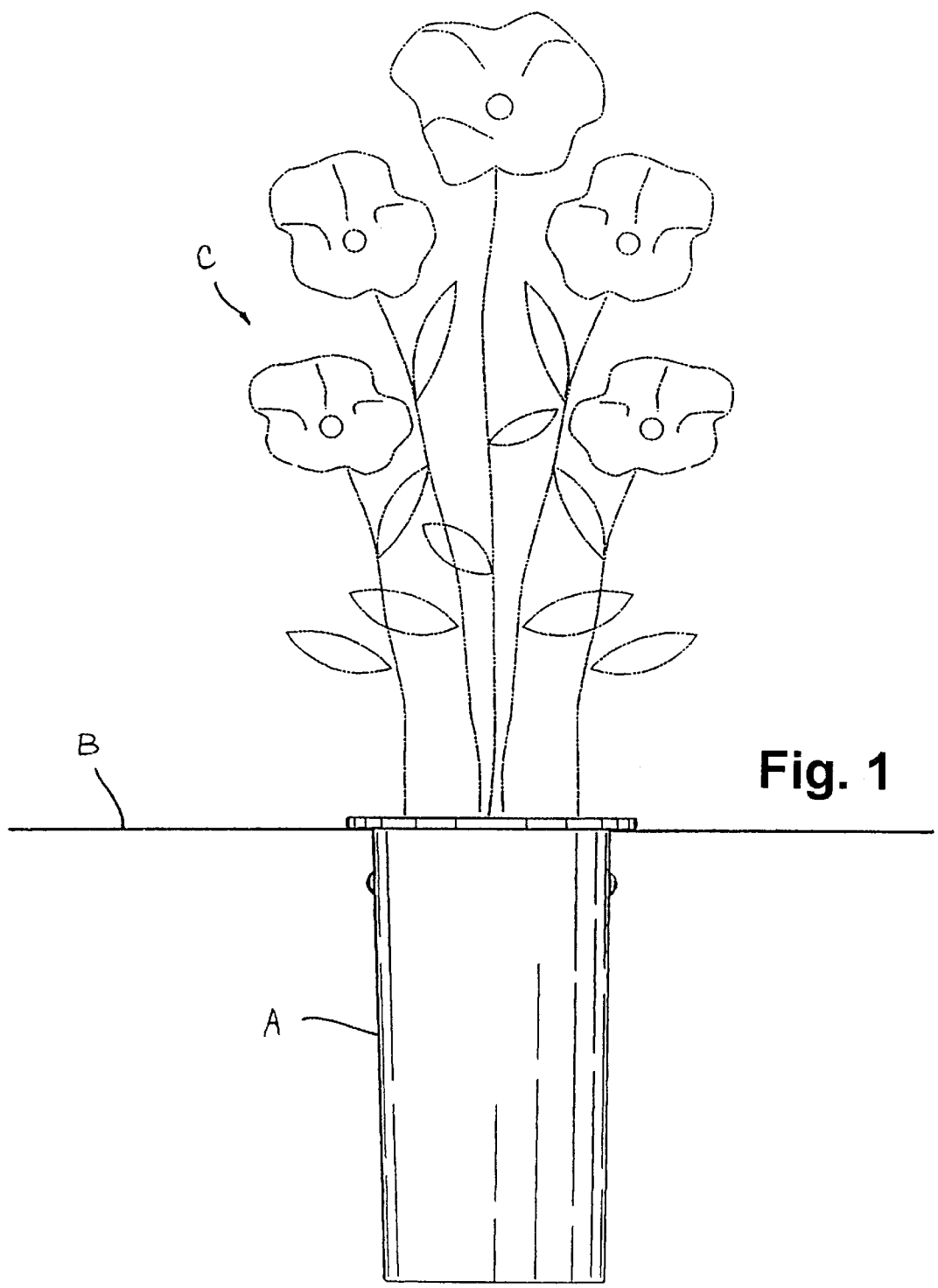
FIG. 1 is a graphical illustration of the flower holder according to an embodiment of the present invention.

With attention to FIG. 1, flower holder A is illustrated as being embedded substantially level with ground B, and having an opening allowing the insertion of flowers C.

Figure 2:
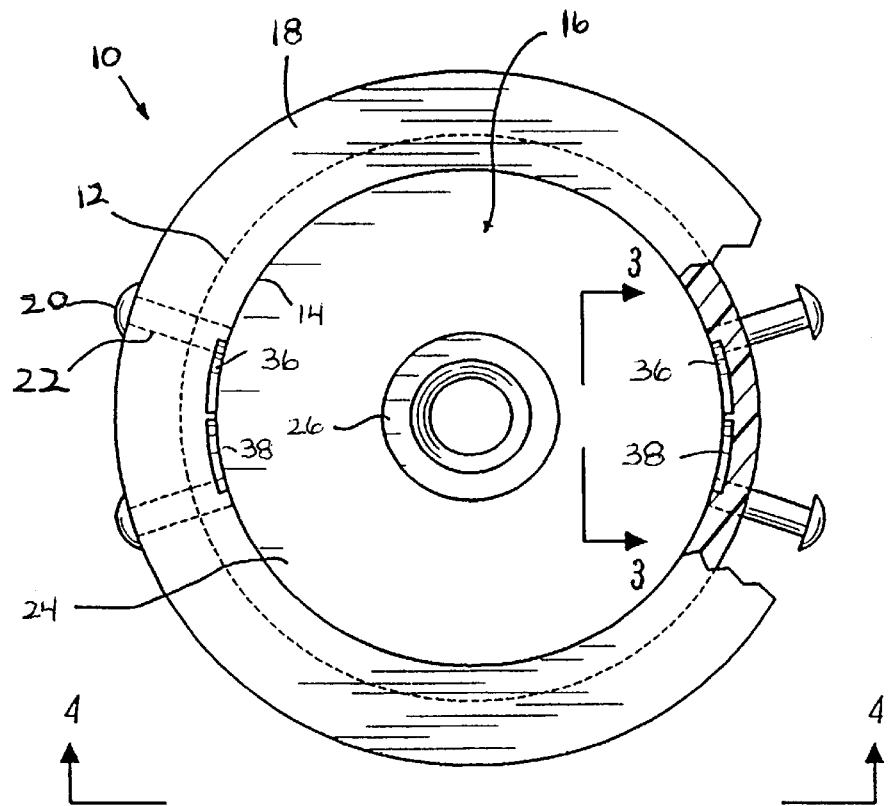
FIG. 2 is a top-plan view of the body of a first embodiment of the present invention.
Figure 3:
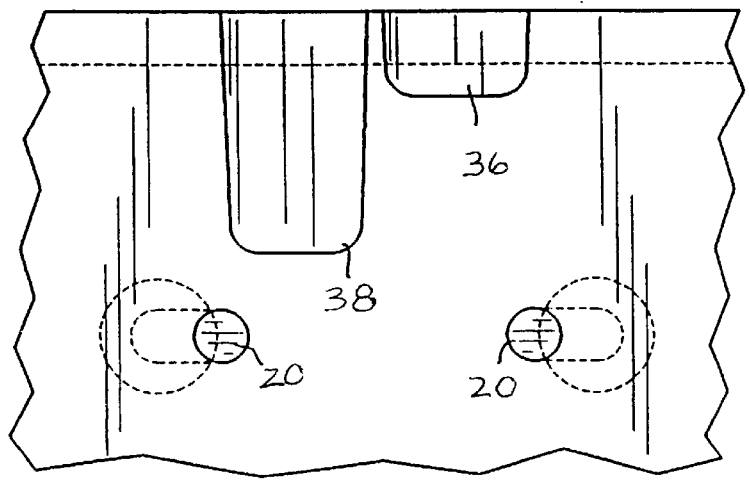
FIG. 3 is a proportional side view of an inner wall of the body of FIG. 2 along line 3—3.
Figure 4:
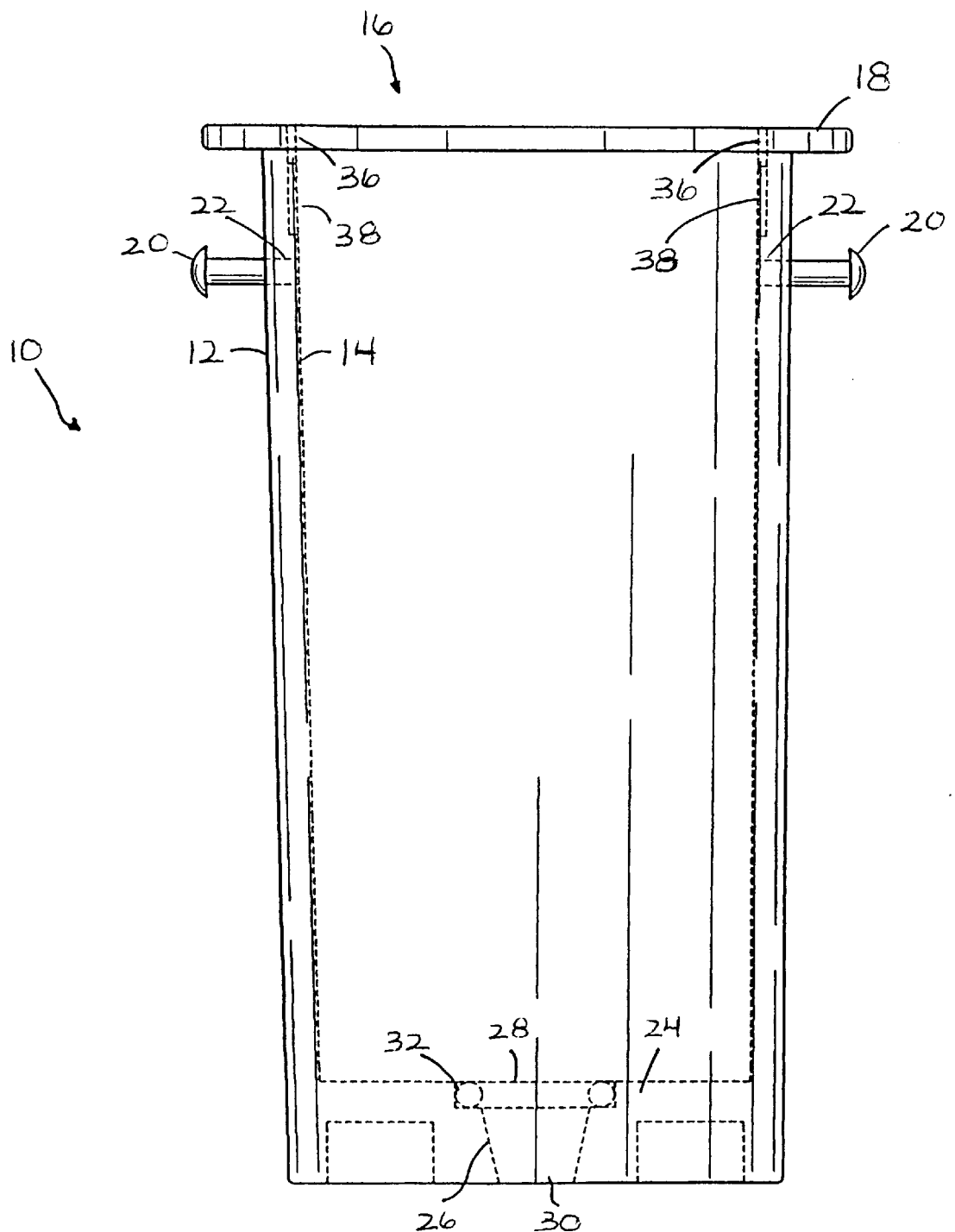
FIG. 4 is a front-plan view of the body FIG. 2 along line 4—4.

Turning attention to FIGS. 2–4, included as part of flower holder A, is cylindrical body 10. Cylindrical body 10 has outer wall 12 and inner wall 14, which defines an interior of cylindrical body 10, and which defines upper opening 16 through which flowers are inserted. An upper planar surface or flange 18 extends past outer wall 12. It is to be appreciated that indicia such as the name of the deceased, religious symbols associated with the religion of the deceased or other indicia may be inscribed on planar surface or flange 18.

As will be discussed in greater detail in the following paragraphs, a plurality of locking pins 20 are provided for insertion within interior of body 10 via through-holes 22, which provide a passage from outer wall 12 to and through inner wall 14.

Located at a lower end of body 10 is base portion 24. Base portion 24 has a funnel-type configuration 26, with upper opening 28 which is larger than lower opening 30. Funnel 26 is designed to provide a passage from the interior of body 10 to outside of the body. It is to be appreciated that when body 10 is embedded within the ground, a common configuration would be to include rocks or a sandy subsurface below funnel 26 to improve drainage from flower holder A. Funnel 26 incorporates a recess into which is placed a sealing ring 32. This sealing ring may be an o-ring or other similar element appropriate for providing a water-tight seal.

With continuing attention to FIGS. 2–4, a pair of first recessed ledges 36 and a pair of second recessed ledges 38 are illustrated. A detailed view of one of each of first recessed ledges 36 and second recessed ledges 38 is illustrated in FIG. 3. Particularly, these recessed ledges are formed within inner wall 14 of body 10, and first recessed ledges 36 have a shorter length than second recessed ledges 38. The use of these recessed ledges will be described in greater detail in the following paragraphs.

Figure 5:
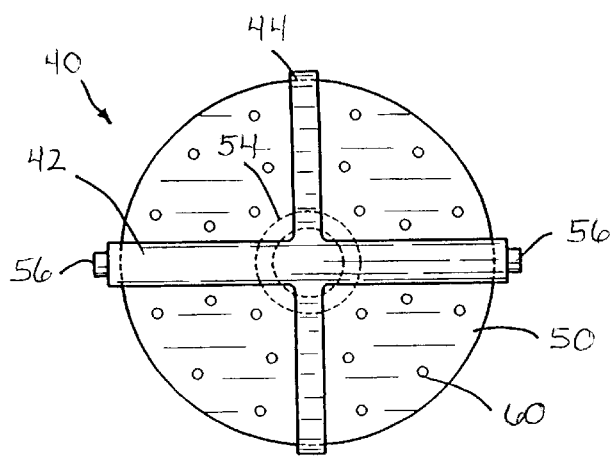
FIG. 5 is a top view of an insert of the flower holder according to the teachings of the present invention.
Figure 6:
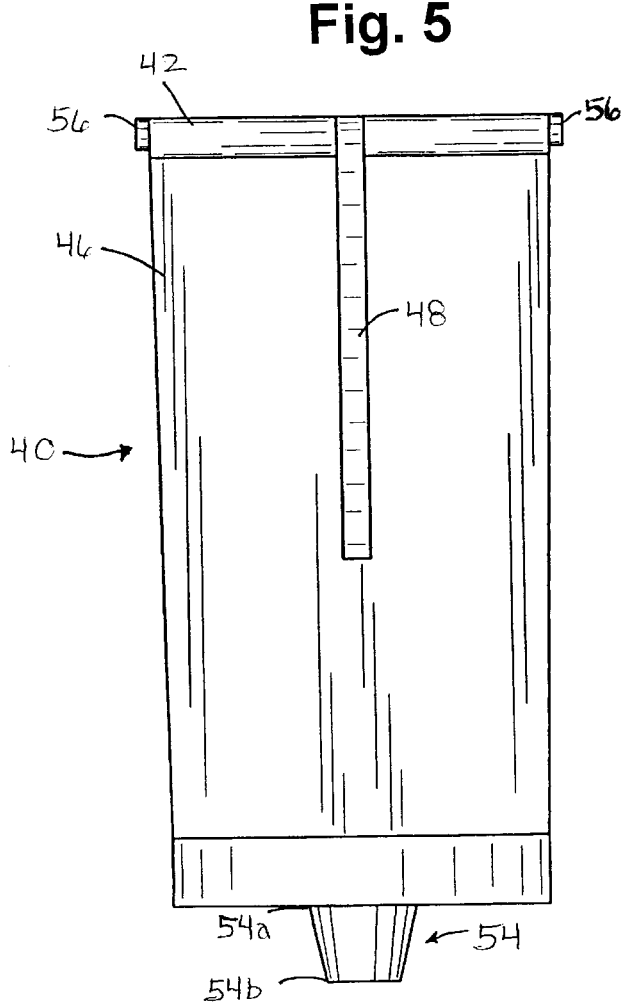
FIGS. 6 and 7 illustrate first and second side views of the insert of FIG. 5.
Figure 7:
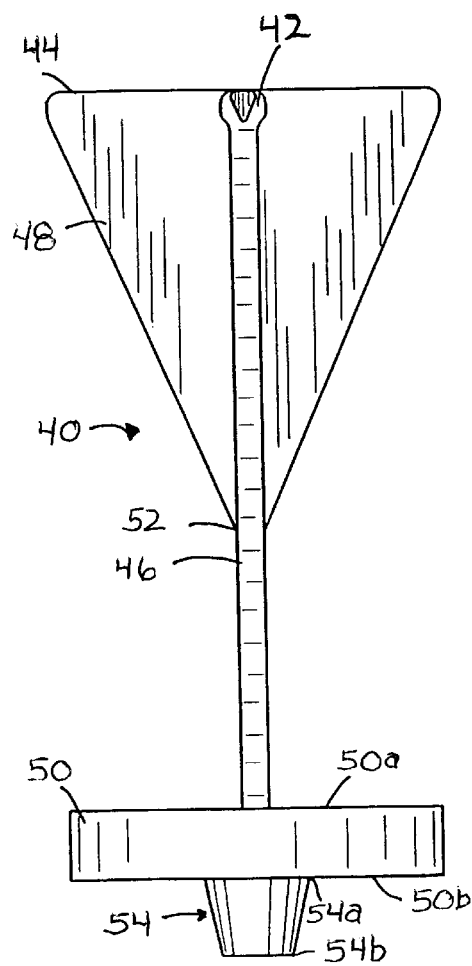

Turning attention to FIGS. 5–7, insert 40 of the first embodiment is depicted. Insert 40 includes gripping area 42 extending across the length of insert 40 and perpendicular to a second potential gripping area 44. Extending from gripping areas 42, 44 are sidewalls 46 and 48. As illustrated in FIG. 6, sidewall 46 has a substantially flat surface extending fully from gripping area 42 to an insert base 50. As illustrated in FIG. 7, sidewall 48 is a tapered sidewall which merges into full sidewall 46 at point 52.

In the present embodiment, insert base 50 includes a plurality of apertures 60 which extend through insert base 50. It is to be appreciated that while the embodiment now under discussion includes apertures 60, insert base 50, of this and other embodiments, may or may not be constructed with such openings.

Insert base 50 includes upper surface 50a and lower surface 50b. Sidewall 46 is connected to upper surface 50a, which will carry the stem ends of flowers placed with body A. Connected to bottom surface 50b is plug 54 having upper end 54a attached thereto and tapering down to lower end 54b. Plug 54 is sized to be inserted within funnel 26 shown in FIGS. 2–4.

Figure 9:
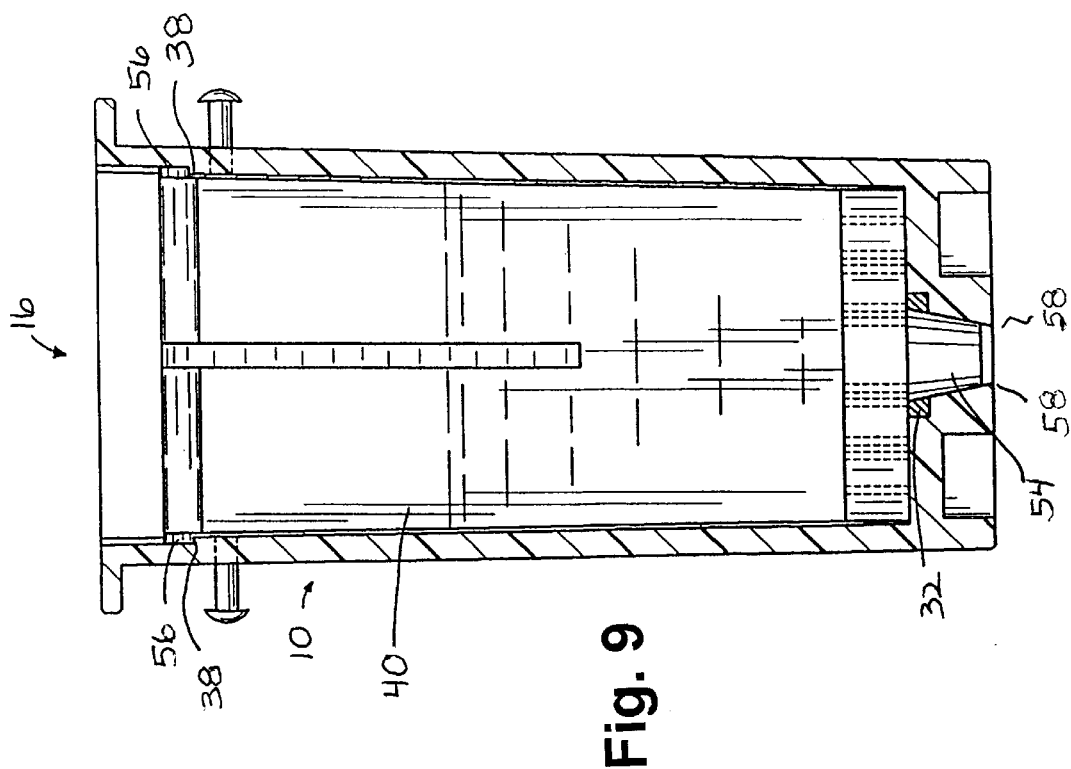
FIGS. 8 and 9 show front-plan views of the insert inserted within the body.
Figure 8:
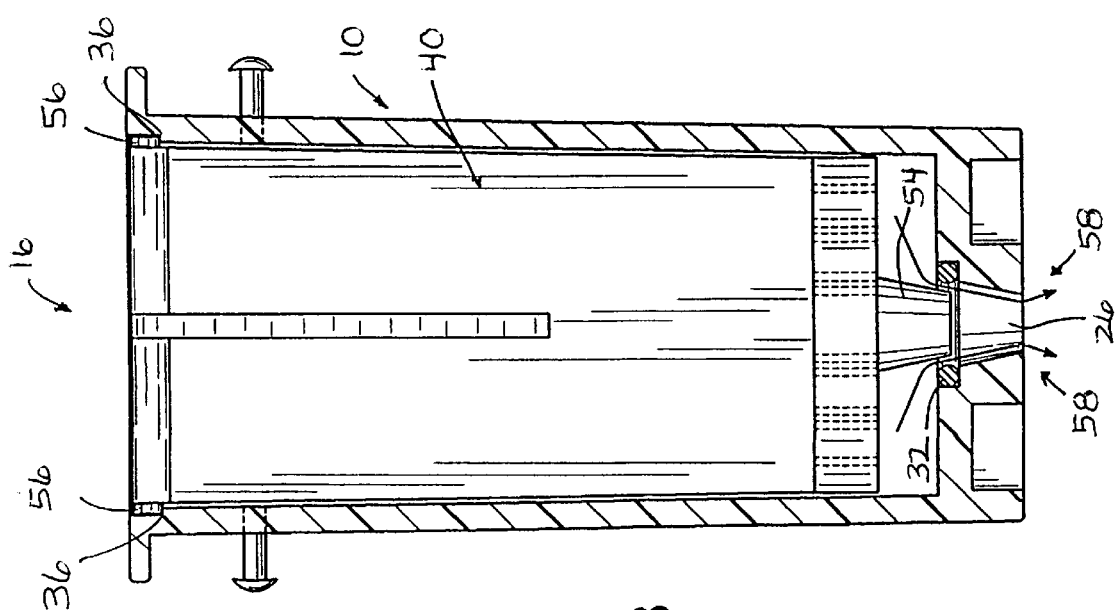

Turning attention to FIGS. 8 and 9, the interrelationship between body 10 and insert 40 is detailed. Particularly, gripping area 42 includes ledge interfaces 56. In FIG. 8 ledge interfaces 56 are positioned within first recessed ledges 36. When in this position, a passage exists from the interior of body 10 to outside thereof through passage 58. When insert 40 is moved such that ledge interfaces 56 are held within second recessed ledges 38, plug 54 is received fully within funnel configuration 26. The foregoing creates a water-tight seal of passage 58, which is assisted by provision of sealing ring 32. Thus, when flower holder A is in the position shown in FIG. 8, water located on the interior of body 10 may be drained therefrom. Thereafter, when flower holder A is in the position shown in FIG. 9, water may be poured into interior of body 10 through opening 16 and the water will be maintained within the interior.

To act as a deterrent to theft, flower holder A includes a locking mechanism. Specifically, pins 20 are inserted into through-holes 22. This concept is shown more clearly in FIGS. 10 and 11. As insert 40 is moved into interior of body 10, pins 20 are in a non-inserted position. Once insert base 50 has been positioned past the location of pins 20, they are inserted into the interior of body 10. Thereafter, as can be viewed in FIG. 11, pins 20 stop insert 40 from being removed from body 10. Also, since flower holder A is buried in ground B, pins 20 are not easily accessible for removal.

A second embodiment of the present invention will now be discussed in connection with FIGS. 12–19.

Figure 12:
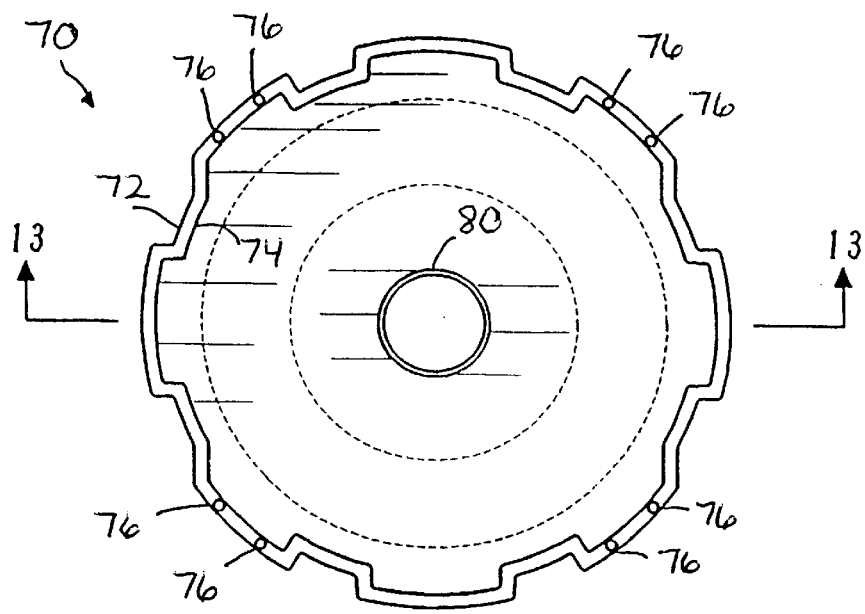
FIG. 12 is a top view of a body according to a second embodiment of the present invention.

Turning first to FIG. 12, a top-plan view of body 70 according to a second embodiment of the present invention is illustrated. As depicted therein, body 70 has a ribbed design, otherwise called a corrugated configuration. Body 70 is constructed in accordance with injection-molding processes, with ribbed outer wall 72 and inner wall 74. Within the area defined by these walls are holes 76 whose use will be discussed in greater detail in the following paragraphs.

Figure 13:
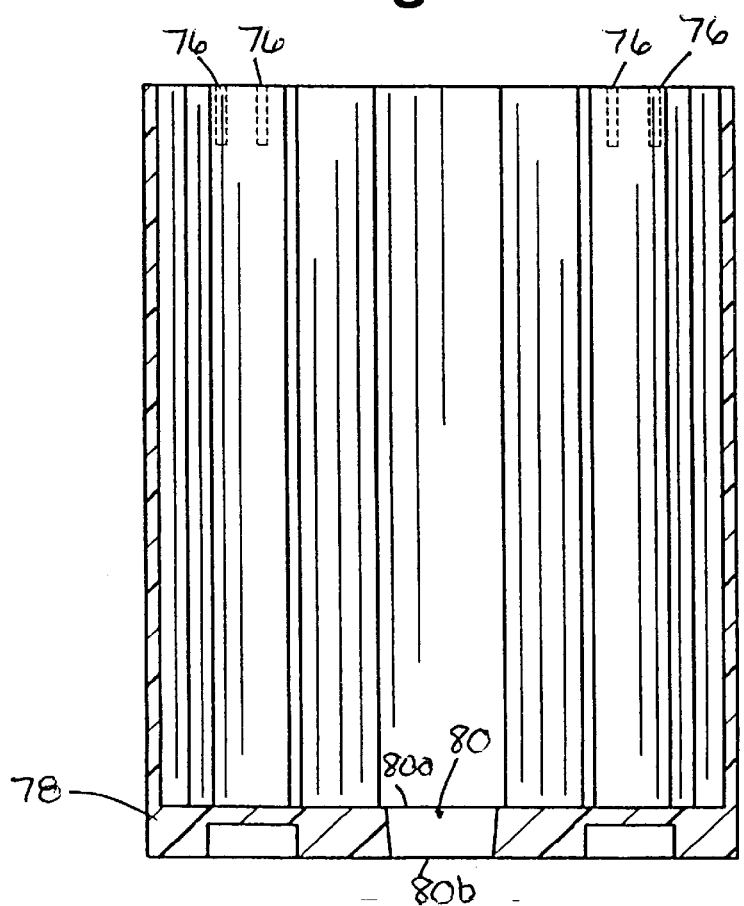
FIG. 13 is a cross-sectional view taken along line 13—13 of FIG. 12.

Similar to the first embodiment, and as shown more clearly in FIG. 13, a base portion 78 has configured therein funnel section 80 with an upper surface 80a tapering to a narrower bottom surface 80b. Funnel 80 defines an opening located in the bottom portion of body 70. Many of the same basic concepts of this second embodiment are similar to that described in connection with the first embodiment. However, due to the corrugated nature of body 70, variations in the construction exist which are taken advantage of in the locking and insert positioning concepts of the present invention.

Figure 14:
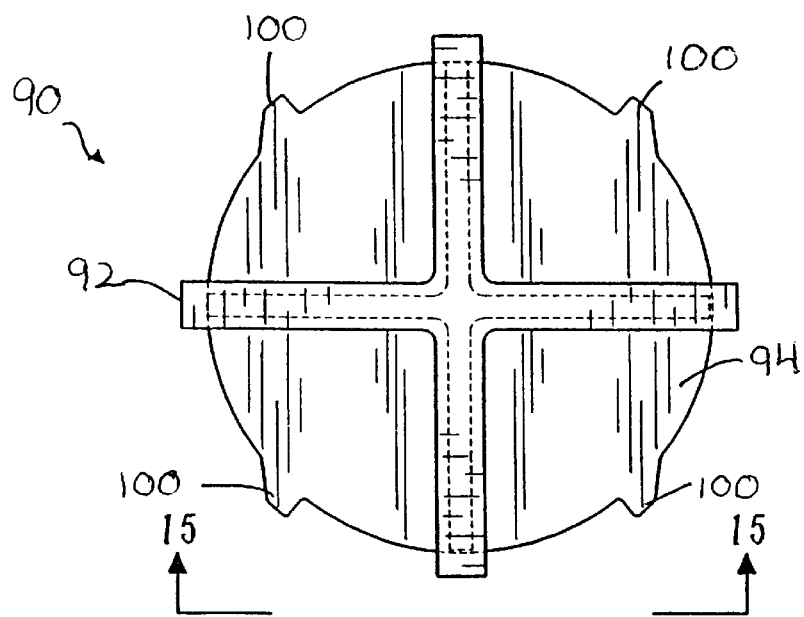
FIG. 14 is a top view of an insert according to a second embodiment of the present invention.
Figure 15:
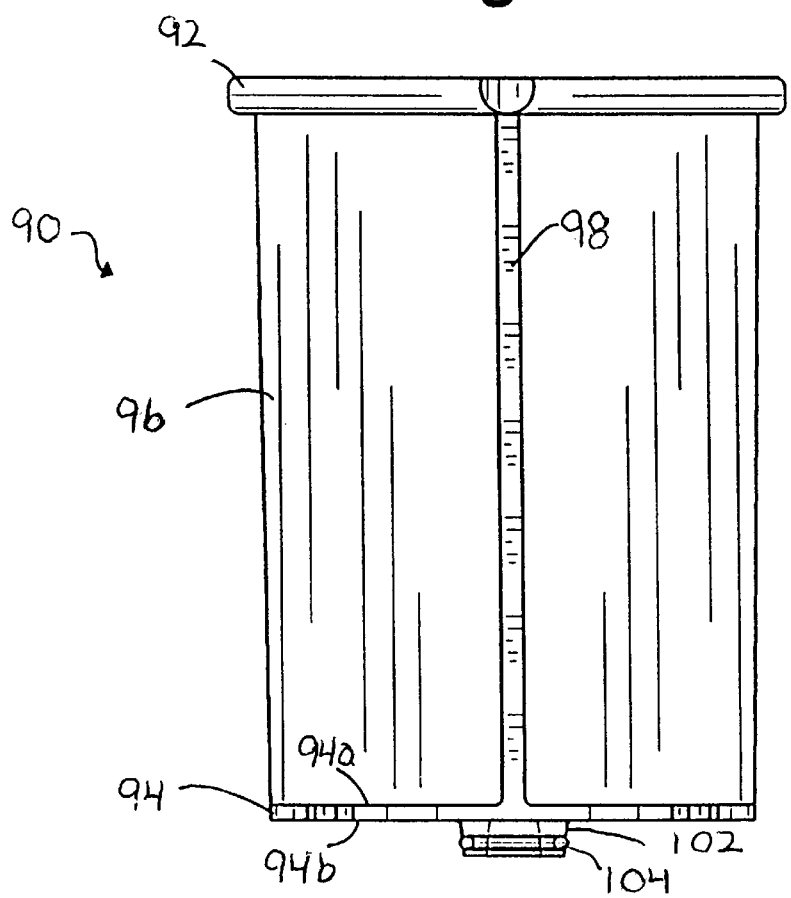
FIG. 15 is a cross-sectional view taken along line 15—15 of FIG. 14.

Turning attention to FIGS. 14 and 15, insert 90 according to the present embodiment is illustrated.

Particularly, gripping area 92 is formed with substantially intersecting horizontal members, and insert base portion 94 is connected to gripping area 92 through sidewalls 96 and 98. It is noted that in this embodiment sidewalls 96 and 98 are shown as full walls extending from gripping area 92 to insert base 94. It is to be appreciated, however, that a tapered wall or other type of configuration may also be possible in this invention.

With further attention to insert base 94, as shown clearly in FIG. 14, protrusions 100 are formed as part of insert base 94. Insert base 94 also includes upper surface 94a which connects to sidewalls 96 and 98, and bottom surface 94b from which extends plug 102. Carried on plug 102, within a recess, is sealing ring 104 which, as will be shown below, improves sealing between plug 102 and funnel 80.

Figure 16A:
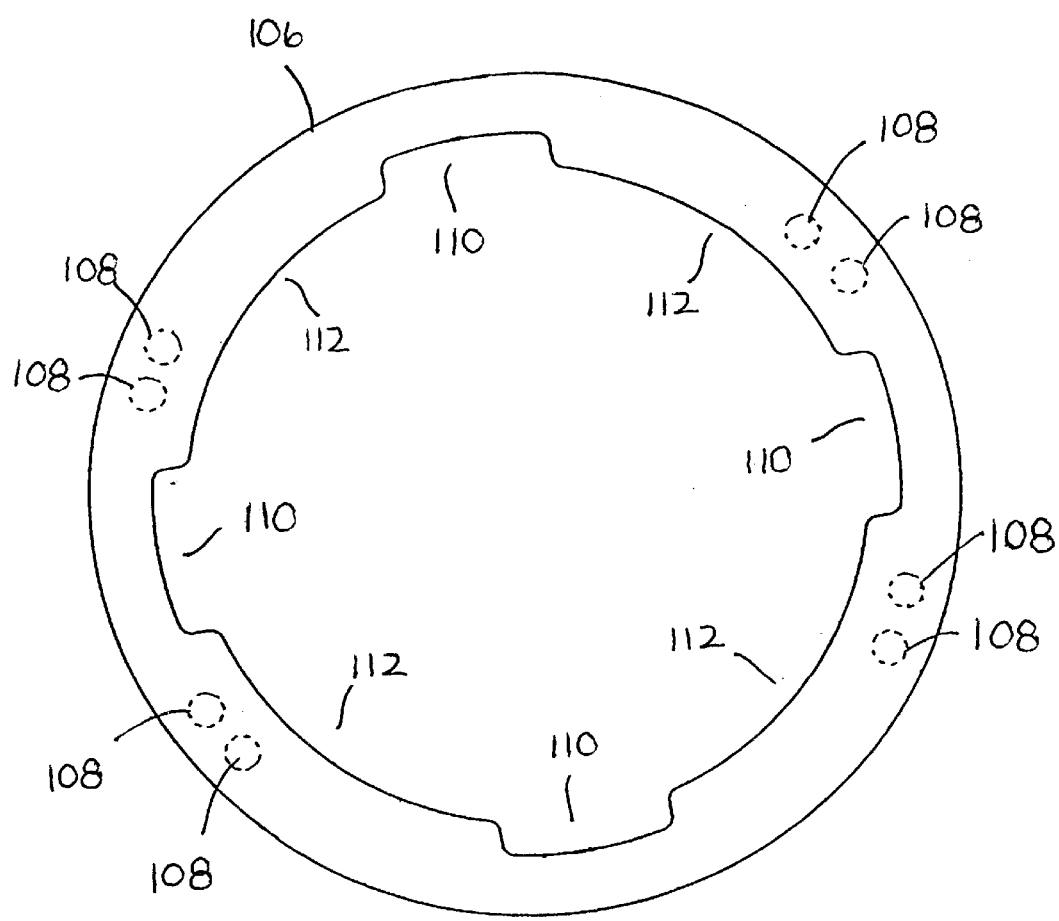
FIG. 16a is a top view of a lid of the second embodiment.
Figure 16B:
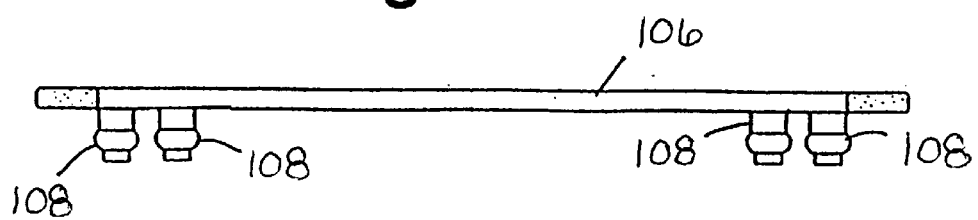
Figure 17A:
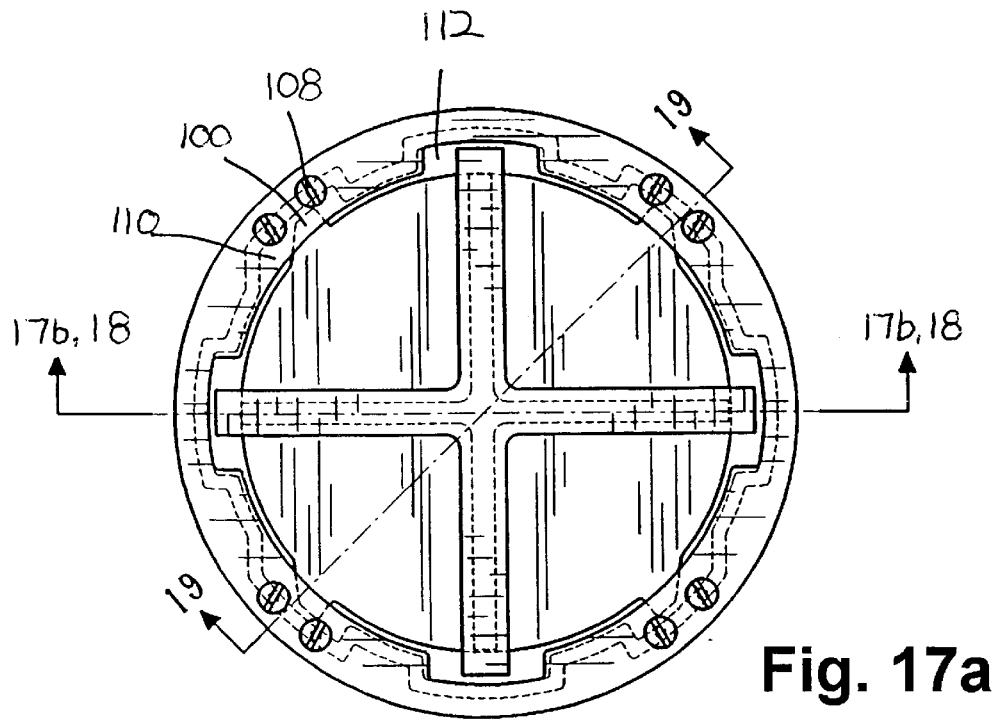
FIG. 17a is a top view of the insert of the second embodiment located within the body of the second embodiment.
Figure 17B:
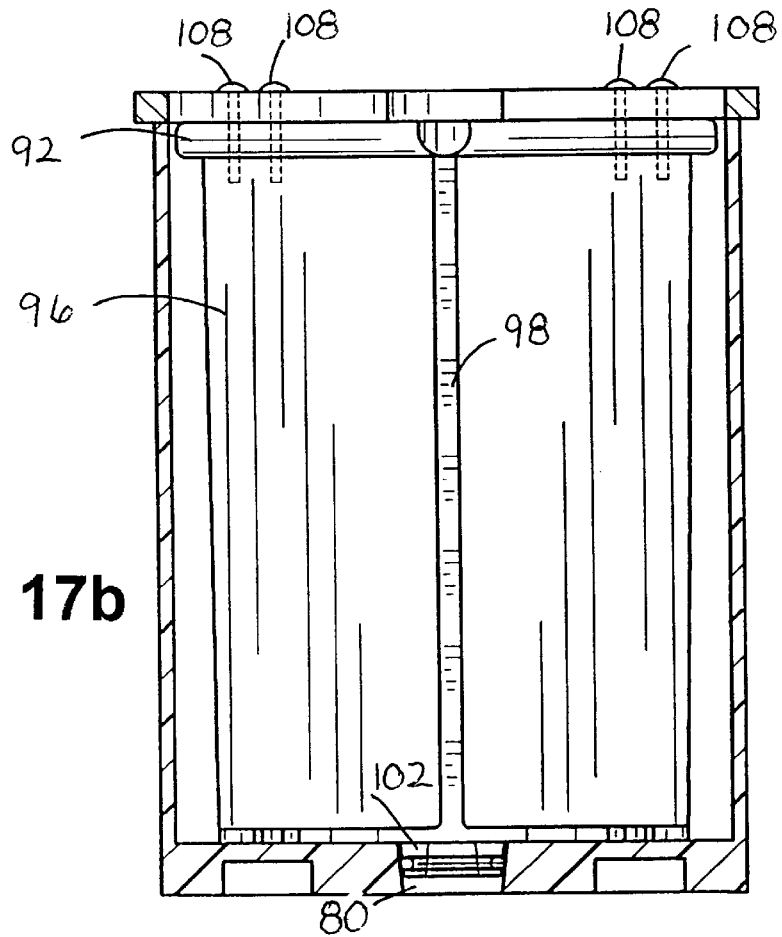
Figure 18:
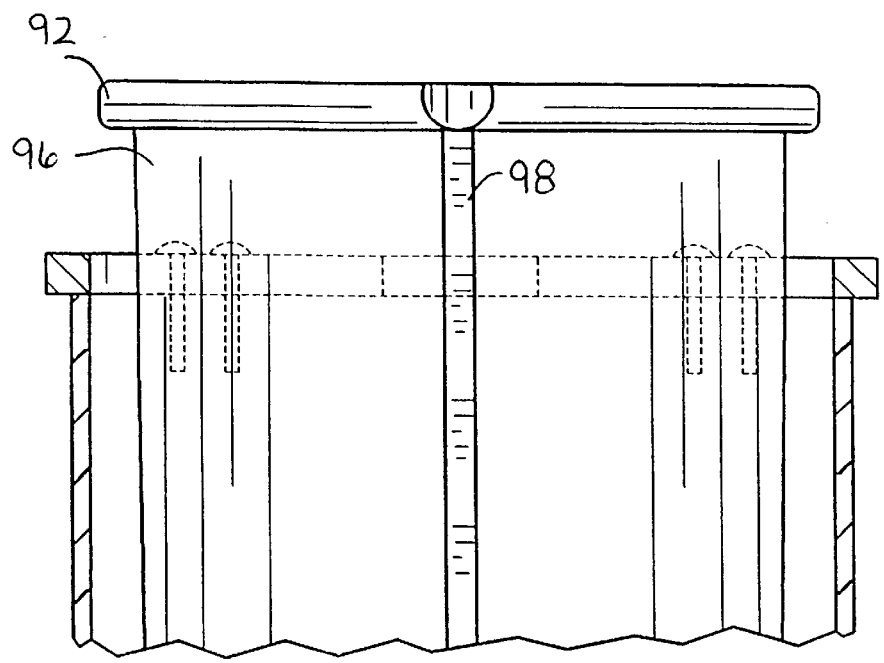
Figure 19:
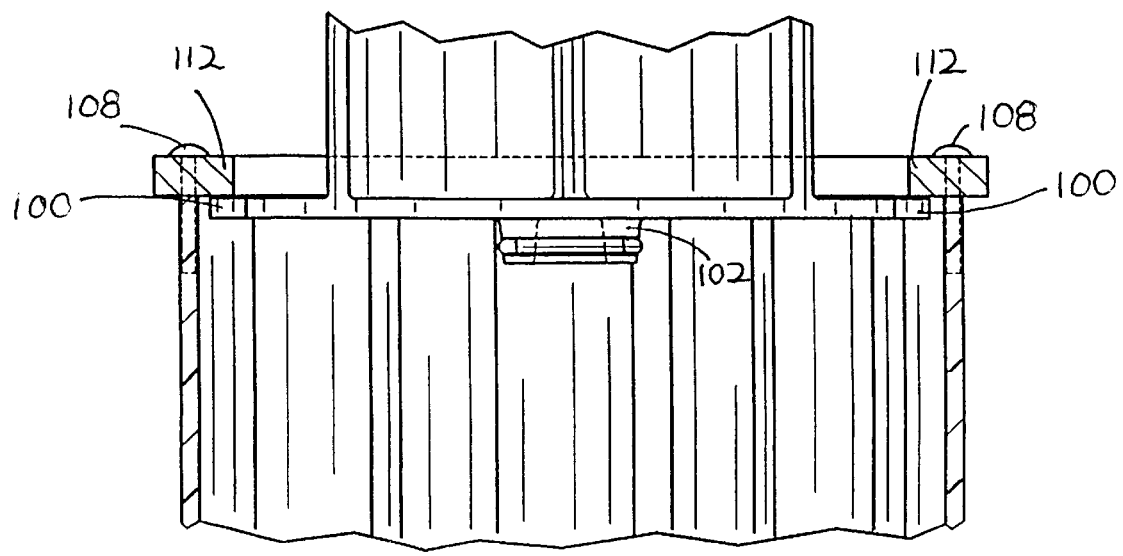

Turning attention to FIGS. 16a and 16b, lid member 106 is illustrated. Lid member 106 is used as a locking device to maintain insert 90 within the interior of body 70. Lid 106 includes tabs 108 extending from a bottom surface of lid 106, as shown in FIG. 16b. The planar surface of lid 106 also includes selected recessed sections 110 and non-recessed sections 112 which, when arranged in proper relationship with holes 76 of body 70, act to lock insert 90 within the interior of body 70. The foregoing concepts are depicted in FIGS. 17a and 17b, where holes 76 of FIG. 12 and the tabs 108 of FIGS. 16a—16b are aligned and lid 106 has been pressed down, snapping tabs 108 into holes 76. This action locks lid 106 to body 70. This locking is of course undertaken after insert 90 has been located within the interior of body 70.

By appropriately locating the recessed sections 110 and non-recessed sections 112 of lid 106, protrusions 100 of insert base 94 will be blocked from removal. This concept is illustrated more particularly in FIGS. 18–19, where protrusions 100 are shown to be blocked by non-recessed sections 112 of lid 106.

Using the corrugated configuration for body 70, in combination with the properly placed protrusions 100, allows for automatic alignment of protrusions 100 and non-recessed sections 112.

Additionally, by locating recessed sections 110 at locations allowing passage of gripping member 92, movement of insert 90 in a vertical direction in relationship to body 70 is possible. Specifically, gripping member 92 is not locked within interior of body 70.

As illustrated in FIGS. 17a and 17b, when gripping member 92 is moved down past lid 106 such that bottom surface 94b of insert base 94 rests on upper surface of base portion 78, plug 102 will become fully inserted within funnel 80. In this arrangement, and similar to the preceding embodiment, there is no opening through which water in the interior of body 70 can pass. However, when gripping member 92 is raised, a passage exists allowing water to flow out of body 70. It is to be noted that in place of recessed ledges 36 and 38 of the preceding embodiment, once insert 90 is raised to allow the water to pass, insert 90 can be rotated, by a restricted amount, and gripping member 92 placed on a non-recessed section 112 of lid 106 thereby keeping the passage open.

Figure 20:
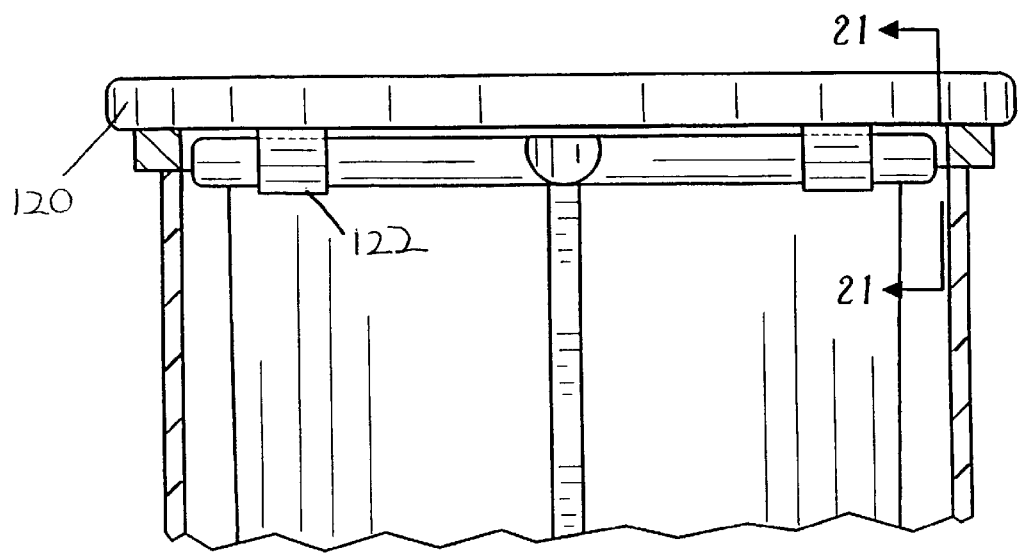
FIG. 20 is a top cover according to the present invention.
Figure 21:
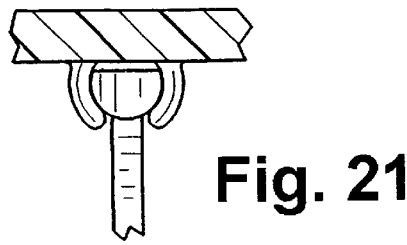
FIG. 21 is a cross-sectional view taken along the line 21—21 of FIG. 20.
Figure 22:
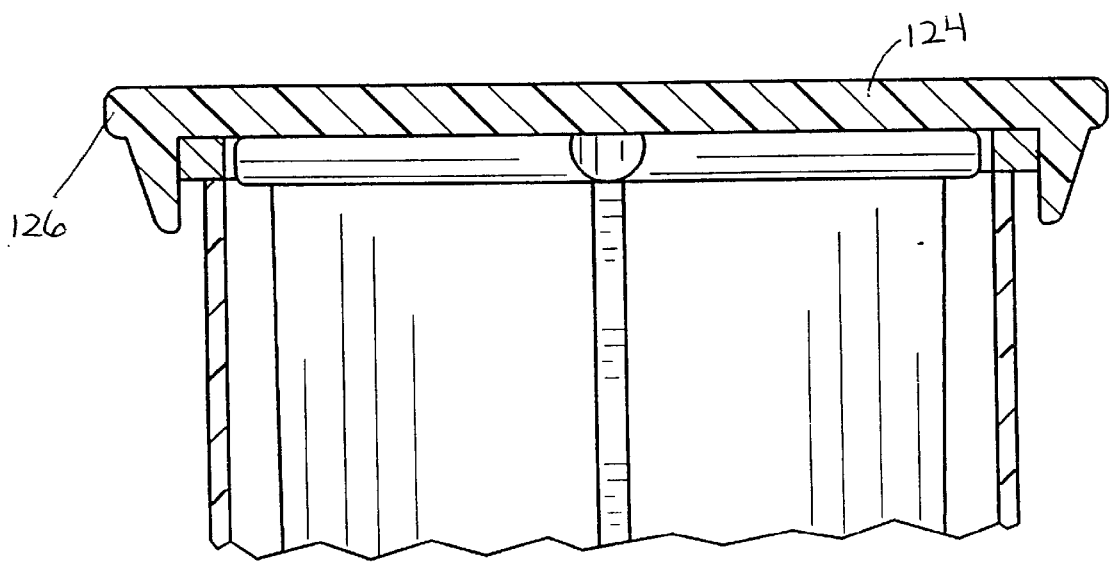
FIG. 22 is a second top cover according to the present invention.

Turning attention to a further aspect of the present invention, often flower holders are empty, and for many cemeteries there are times when flowers are not permitted, for example during the winter season. Therefore, it is deemed desirable to provide a cover during these occasions so that debris such as dirt, snow, etc. will not enter the interior of bodies 10 or 70. In consideration thereof, a cemetery cover has been considered useful. FIGS. 20–22 depict embodiments of such covers. In FIG. 20, a first cover 120 having opposing biased prongs 122 is snapped onto gripping members 42, 92 of one of the foregoing flower body embodiments. This snapping onto the gripping member is illustrated in FIG. 21.

As to another cover embodiment, FIG. 22 shows a second cover 124 having edge snapping element 126, which is a flexible angled rim portion made to fit over the outer edge of body A. Constructed according to the described embodiment it provides a tight, secure snapping action to hold cover 124 in secure engagement with the flower holder. Covers 120 and 124 may be separate from the flower holder or may be attached in a flip-top type configuration.

FIGS. 23–28 illustrate a third embodiment of the present invention.

Figure 23:
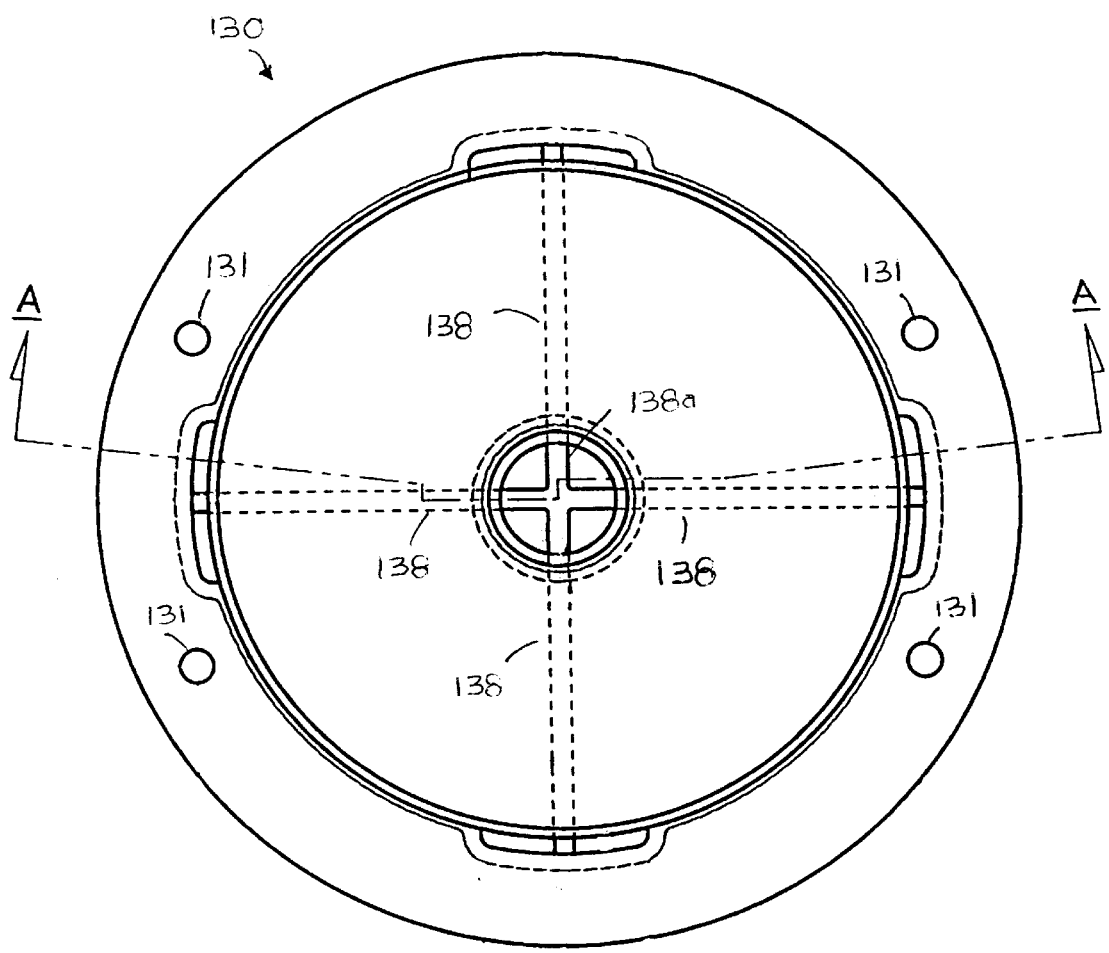
FIG. 23 is a top view of a body of a third embodiment of the present invention.
Figure 24:
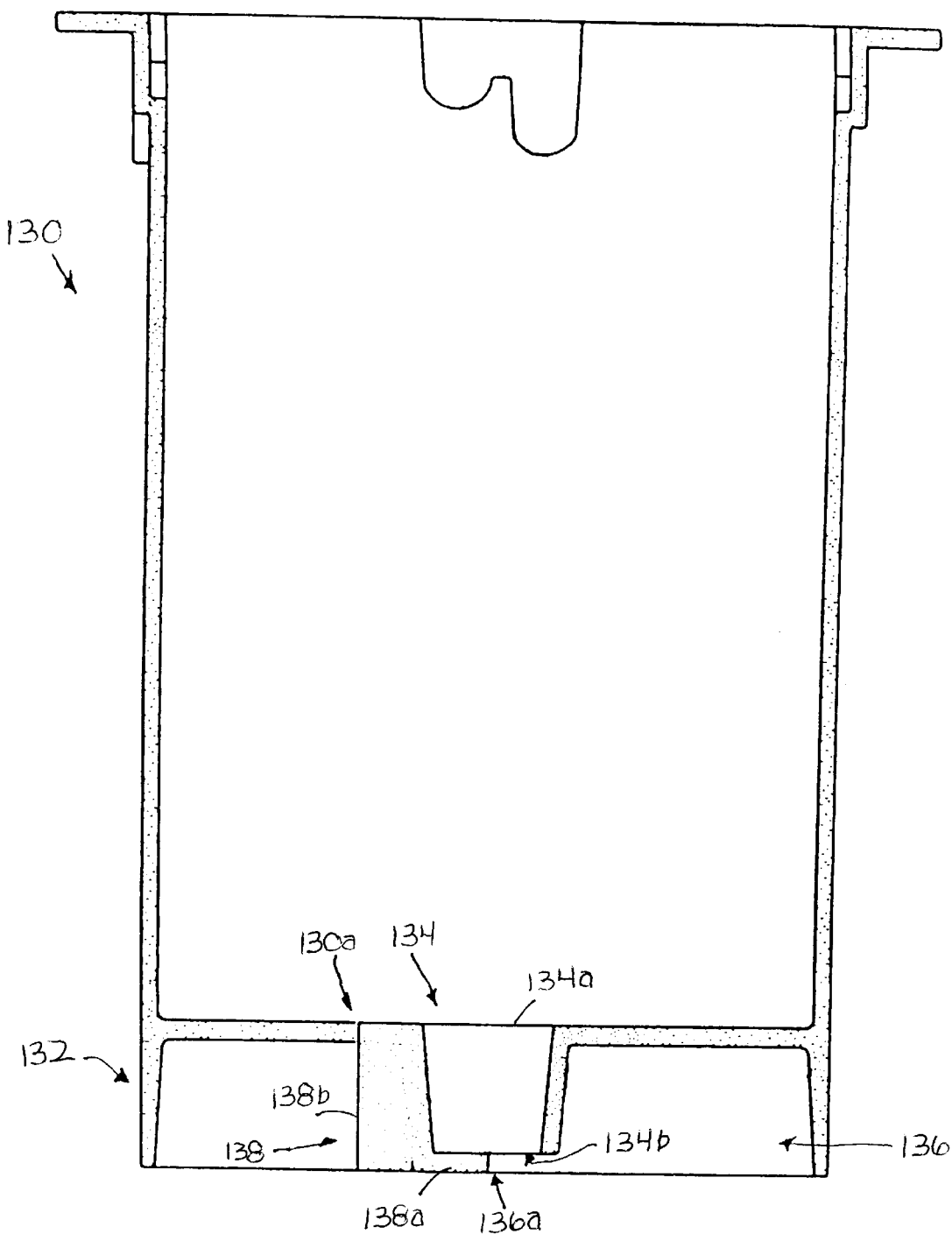
FIG. 24 is a cross-sectional view of FIG. 23 along line A—A.

Turning first to FIGS. 23 and 24, body 130, includes extended base portion 132. Base portion 132 has configured therein funnel section 134, with an upper surface 134a tapering to narrower bottom surface 134b. Funnel 134 defines an opening located in the bottom portion of body 130. Many of the same concepts described in the first and second embodiments are similar to that described in connection of this embodiment of the body. However, it is noted that base portion 132 is substantially deeper than shown in the previous embodiments. This extended base portion 132 provides for at least one of a longer funnel 134 and a clearance channel 136 below and around funnel 134. In particular, it has been deemed desirable by the inventors to provide this elongated funnel and extended clearance channel 136 so that when water is evacuated from the bottom of body 130, the water does not back up into the inner area of body 130. The elongated funnel and clearance channel 136 provide an area for downward movement of the water which allows for an improved drainage.

When the present invention is installed, a layer of stone or rock may be inserted below the bottom surface of body 130. The outer opening 136a of clearance channel 136 will come into near or actual contact with the stones or rocks. By adding additional distance of clearance channel 136 from the bottom 134b of funnel 134, the water passing out of body 130 will be made to flow smoothly.

It is to be noted that clearance channel 136 includes grating 138 as shown more clearly in FIG. 23. Grating 138 is located at the bottom surface of clearance channel 136 near outer opening 136a. Grating 138 is in a cross pattern which extends to the inner walls of body 130, and is provided to ensure that stones, rocks or dirt do not block the exiting of water. In particular, the stones or rocks which are used are of a sufficient size, so that grating 138 will block them from becoming stuck within clearance channel 136. As shown in FIGS. 23 and 24, grating section 138a located under funnel 134 only extends up to the bottom of funnel 134b, while grating section 138b extends up to the bottom of body 130a from the bottom portion of clearance channel 136.

Figure 25:
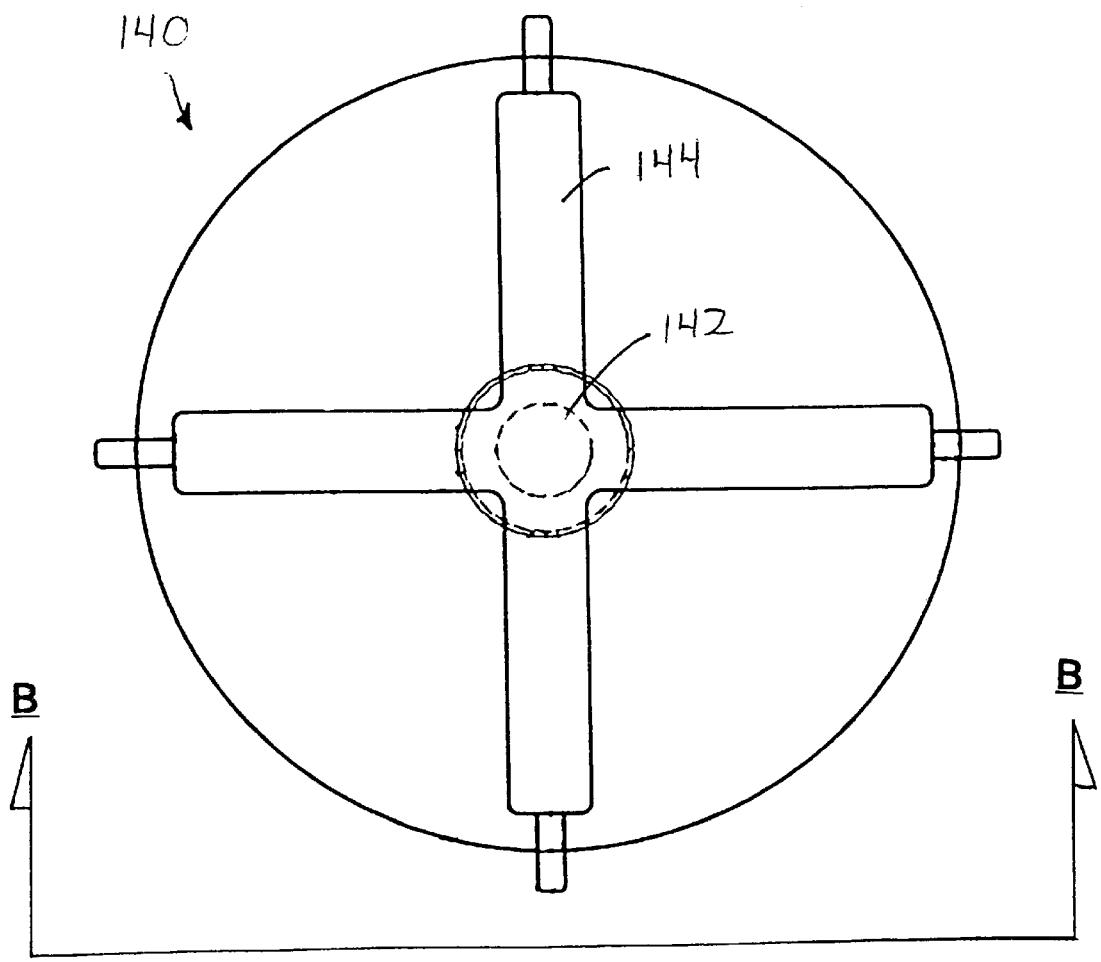
FIG. 25 is a top view of an insert of the third embodiment of the present invention along line B—B.
Figure 26:
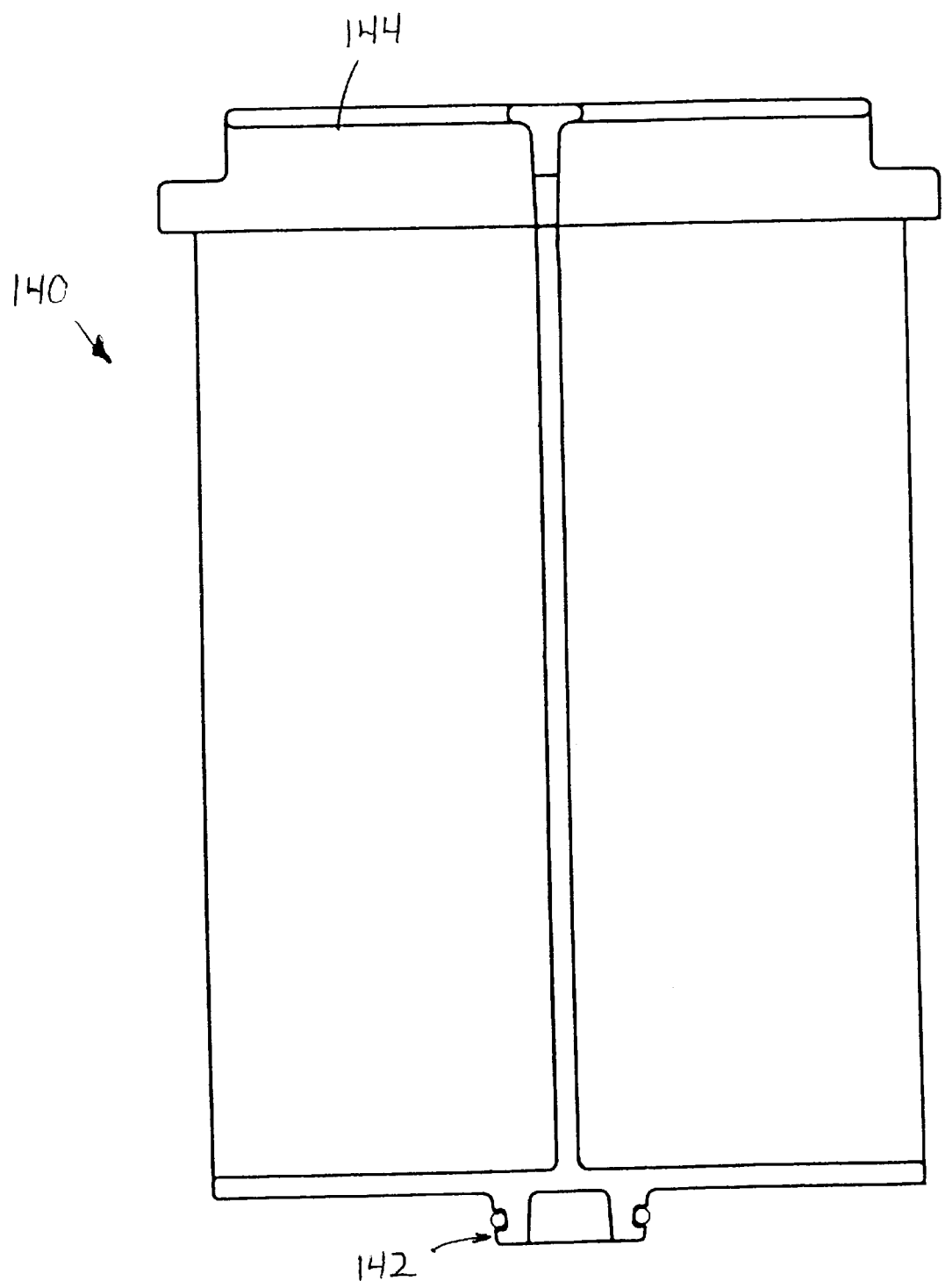
FIG. 26 is a cross-sectional view of FIG. 25.

FIGS. 25 and 26 illustrate insert 140 which is configured to be placed within body 130, and which includes plug 142 used to seal the opening of funnel 134, so that water will not pass through clearance channel 136. Insert 140 also includes gripping areas 144. It is noted that insert 140 is similar to the insert shown in FIGS. 14 and 15, however, the base portion 142 does not require the protrusions 100 as shown in FIG. 14. Insert 140 of the present embodiment is depicted with a full wall configuration, however, tapering walls such as illustrated in FIGS. 6 and 7 of previous embodiments may also be used.

Figure 27:
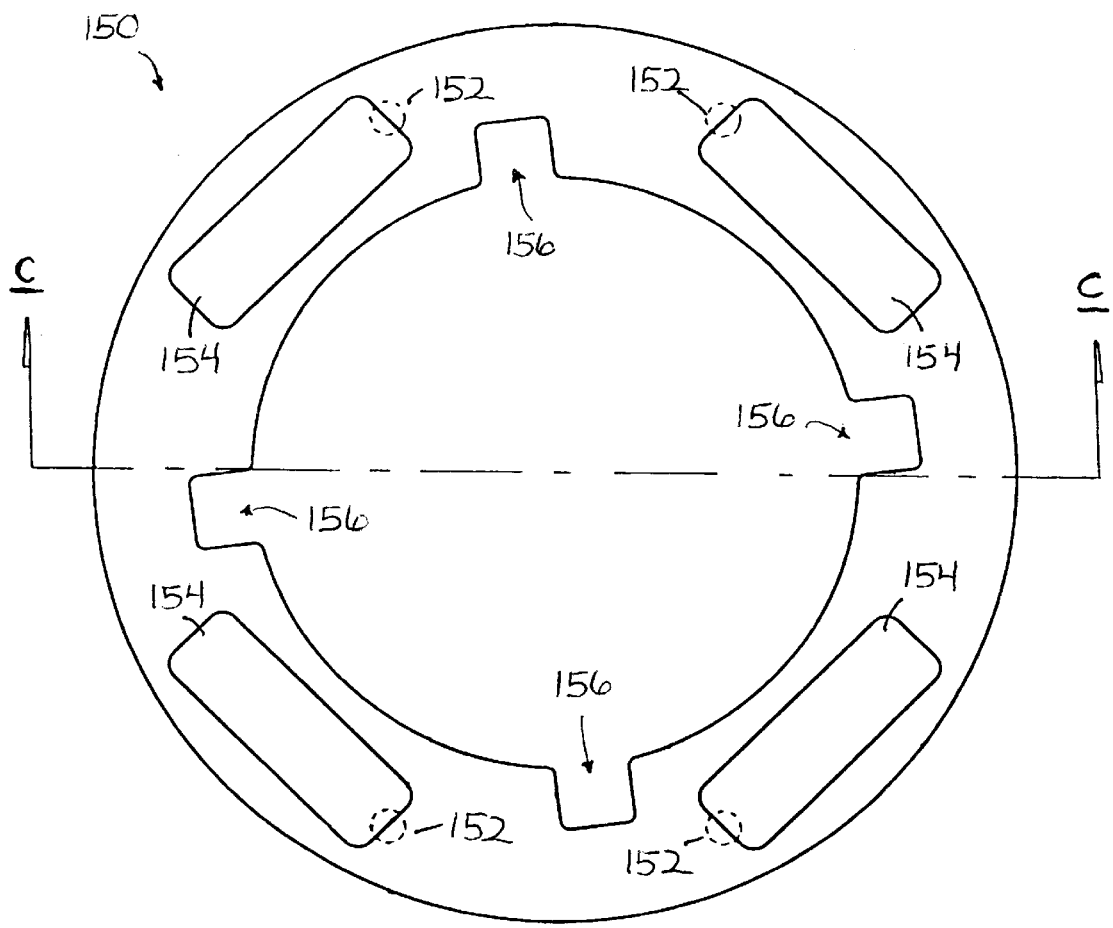
FIG. 27 is a top view of a lid of the third embodiment of the present invention.
Figure 28:
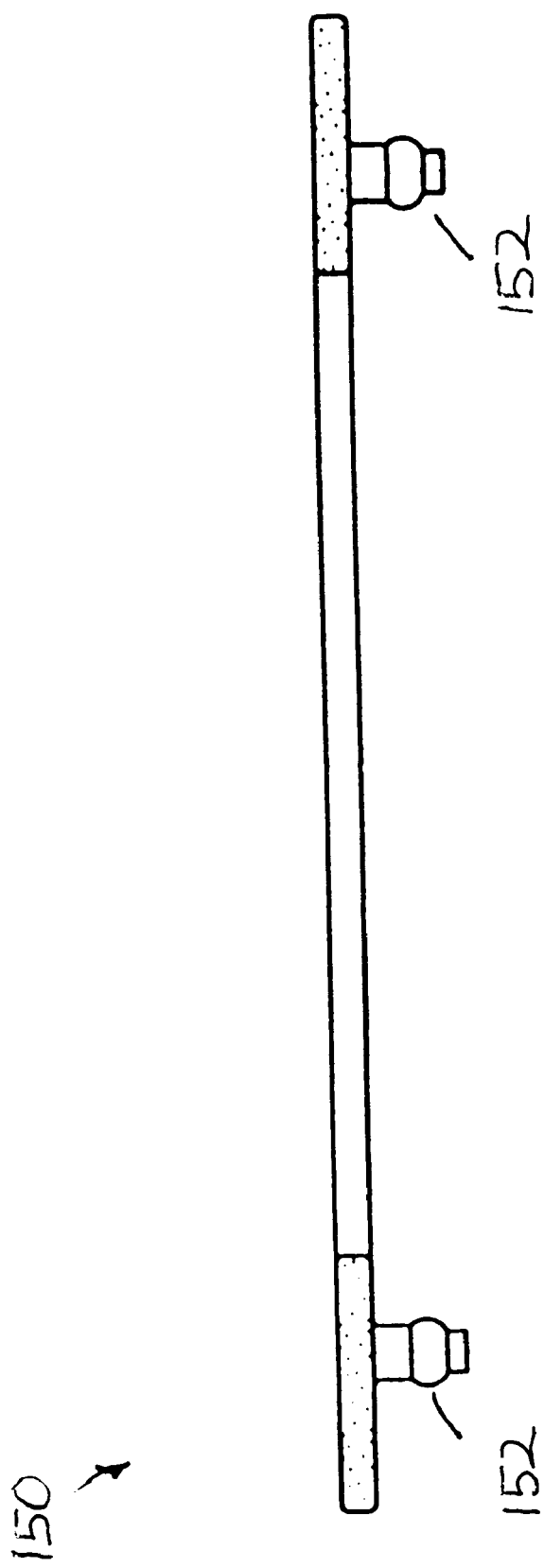
FIG. 28 is a cross-sectional view of FIG. 27 along line C—C.

FIGS. 27 and 28 provide two views of lid member 150 used in this embodiment. Lid member 150 of FIGS. 27 and 28 is similar to lid member shown in FIGS. 16a–16b. In particular, lid member 150 is used to lock insert 140 into body 130. In this embodiment however, only four tabs 152 are used to lock the lid member into holes 131 of body 130 (FIGS. 23 and 24). Also, lid member 150 includes indicia areas 154 which are regions where religious, or other symbols may be placed. Recessed areas 156 are used in a manner similar to previous embodiments.

Flower holder A may be formed of polypropylene, by an injection-molding process. From a manufacturing consideration, polypropylene is desirable due to its light weight, thin wall design and advantageous manufacturing costs. However, it should be further understood that other materials may be used as well as other processes. For example this invention may be implemented with metal, wood, ceramic or other plastic materials.

It is to be appreciated the foregoing description provides embodiments of the present invention. However, it is understood that the accomplishments of the present invention can be obtained using other configurations. Particularly, while in the present invention the insert includes walls which connect the gripping area to the insert base, single or multiple post members can be used to connect a gripping member to an insert base member. The wall members were described in these embodiments to provide the additional benefit of allowing a spreading out or dividing of the flower elements.

Further, while the sealing ring is described as being provided in a recessed portion of either the plug or funnel, it is understood that other sealing configurations may be used such as around the exterior of the base portion. Also, various dimensions, such as the wall thickness of body and insert, circumference of the flower holder, lengths of the body and insert, among other configurational concepts, may be used in building the present invention. Additionally, while a tapered funnel opening provided in the body base has been used, other configurations may also be used, as long as a seal is obtained between the body and insert.

With respect to the above description then, it is to be realized that the optimal dimensional relationships for the parts of the invention, to include variations in size, materials, shape, form, function and manner of operation, assembly and use are deemed readily apparent and obvious to one skilled in the art and all equivalent relations to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described and accordingly, all suitable modifications and equivalence may be resorted to falling within the scope of the invention.

In consideration thereof, we claim:

1. A self draining in-ground flower holder comprising:
    a body, configured to be embedded in the ground, having (i) an upper end portion defining an opening of the body and a lower end portion, (ii) a planar area of the upper end portion located around the upper end opening, (iii) a body base, located at the lower end portion, having an upper surface and a lower surface, and having configured therein a passage, and (iv) first and second recessed ledges configured within an inner sidewall of the body, the second recessed ledge being larger than the first recessed ledge;
    an insert, fitted within the body thereby allowing for vertical movement of the insert in relationship to the body, and having (i) a gripping area whereby the insert is accessed within a the body, a portion of the gripping area being held within one of the first and second ledges, (ii) an insert base having an upper surface and a lower surface, (iii) sidewalls which divide an interior of the body into sections, at least one of the sidewalls extending from the gripping area to the upper surface of the insert base, (iv) a plug having an upper portion and a lower portion, the upper portion connected to the lower surface of the insert base, wherein the plug fits within the passage of the body base when the gripping area is held in the second recessed ledge; and
    a lock for holding the insert within the body.

2. The self draining in-ground flower holder according to claim 1, wherein the planar area is configured so as to have indicia inscribed thereon.

3. The self draining in-ground flower holder according to claim 1 wherein, when the gripping area is held in the first recessed ledge, a passage is formed from an interior of the body to outside of the body.

4. The self draining in-ground flower holder according to claim 1, wherein the lock is comprised of a plurality of pins inserted through apertures in the wall of the body, when the insert base is located at a position below the apertures, whereby the inserted pins trap the insert within the body.

5. The self draining in-ground flower holder according to claim 1, wherein the passage is a funnel configuration and includes a recessed area within which is held a sealing ring which provides a water-tight seal between the plug and the funnel configuration, when the gripping section of the insert is held in the second recessed ledge.

6. The self draining in-ground flower holder according to claim 1, wherein the body has a substantially cylindrical body.

7. A flower holder comprising:

a body having an at least partially open upper end, an at least partially open lower end, and a sidewall interconnecting the upper end to the lower end thereby forming an interior;

an insert configured so as to be insertable within the interior of the body and including a gripping area to be held in at least one of first and second holding positions, an insert base having an upper surface and a lower surface, the lower surface carrying a plug, and an interconnecting section which connects the gripping area to the upper surface of the insert base, wherein when the gripping area is held in the second holding position the at least partially open lower end is provided with a water-tight seal with the plug, and when the gripping area is held in the first holding position a passage is provided through the at least partially open lower section.

8. The flower holder according to claim 7, wherein the at least partially open lower end is a funnel configuration.

9. The flower holder according to claim 8, wherein the plug has a substantially similar configuration as the funnel.

10. The flower holder according to claim 9, wherein the plug includes a recessed area within which is held a sealing ring which provides the water-tight seal between the plug and the funnel, when the gripping area of the insert is held in the second holding position.

11. The flower holder according to claim 10 wherein, when the gripping area is held in the first holding position, the passage formed thereby allows a liquid to pass from an interior of the body to outside of the body.

12. The flower holder according to claim 9, wherein the funnel includes a recessed area within which is held a seal ring which provides the water-tight seal between the plug and the funnel, when the gripping area of the insert is held in the second holding position.

13. The self draining in-ground flower holder according to claim 9, wherein the body has a corrugated body.

14. The flower holder according to claim 7, further including a lock which locks the insert into the body.

15. The flower holder according to claim 14, wherein the at least partially open upper end includes a planar area extending past the sidewall which defines the interior.

16. The flower holder according to claim 15, wherein the lock is comprised of a lid attached to the planar area, wherein the lid is configured to stop the insert from being removed from the interior of the holder.

17. The flower holder according to claim 16, wherein the lid includes an upper planar surface upon which indicia may be inscribed.

18. The flower holder according to claim 16, wherein the lid includes a plurality of tabs extending from a bottom planar surface, the tabs arranged to match with a plurality of apertures in the sidewall of the cylindrical body, such that when the tabs engage the apertures the lid is snapped into a locked relationship with the body.

19. The flower holder according to claim 7, wherein the body is formed to include a plurality of ribs in a substantially cylindrical configuration.

20. The flower holder according to claim 19, wherein the insert base includes a plurality of protrusions which fit into recessed areas of the ribbed body.

* * * * *